United States Patent [19]
Eckerman et al.

[11] 3,817,185
[45] June 18, 1974

[54] DRIVE SYSTEM FOR AN AUTOMATIC ROAD NETWORK WITH PASSIVELY GUIDED VEHICLES

[75] Inventors: Gunter Eckerman, Dusseldorf-Benrath; Heinz-Georg Ludwig, Haan/Rheinland, both of Germany

[73] Assignee: Kiepe Electric AG, Neuhausen am Rheinfall, Switzerland

[22] Filed: July 11, 1972

[21] Appl. No.: 270,787

[30] Foreign Application Priority Data
July 15, 1971 Germany............................ 2135263

[52] U.S. Cl..................... 104/152, 191/4, 318/441
[51] Int. Cl........................... B60l 9/04, B60l 15/04
[58] Field of Search................... 318/440, 441, 442; 104/149, 152; 191/4; 307/9

[56] References Cited
UNITED STATES PATENTS

| | | | |
|---|---|---|---|
| 1,710,326 | 4/1929 | Swartwout | 104/149 |
| 2,447,669 | 8/1948 | Riley | 104/149 |
| 2,872,879 | 2/1959 | Vierling | 104/149 |
| 3,182,742 | 5/1965 | Dow | 191/4 |
| 3,476,889 | 11/1969 | Belcher et al. | 104/149 |

Primary Examiner—M. Henson Wood, Jr.
Assistant Examiner—George H. Libman
Attorney, Agent, or Firm—Burgess, Dinklage & Sprung

[57] ABSTRACT

In a drive system for an automatic road system with electrically powered passively guided vehicles and stations at which passengers may leave and enter, the improvement wherein each vehicle in said system is driven and braked by a direct current motor whose field coil is fed by a battery located in said vehicle and whose armature is fed with direct current through a vehicle conductor disposed along the road system, from at least one stationary apparatus in electrical association with the automatic road system which is provided with phase shift control.

15 Claims, 2 Drawing Figures

DRIVE SYSTEM FOR AN AUTOMATIC ROAD NETWORK WITH PASSIVELY GUIDED VEHICLES

BACKGROUND OF THE INVENTION

1. Field of the Invention

This invention relates to a drive system for an automatic network with passively guided vehicles and stations at which passengers may leave and enter such vehicles. This invention is particularly directed to an aumtomatic road system wherein regulation of speed is facilitated through use of a plurality of stationary apparatuses, each of which is provided with a phase shift control wherein the same is in electrical association with the automatic road system. The drive system of the present invention is especially suitable for a road network on which individual, relatively small and light vehicles can be passively guided, with controlled space between them, in tracks on a traffic grid. These lightweight vehicles are automatically delivered to a specific station in the grid. Such a traffic grid may consist, for example, of any desired number or roadways crossing one another in an approximately quadratic, continuous arrangement in rows, it being possible to switch from one road to any other road in order to reach any desired station within the grid, under automatic control, over any desired route. In such a system a station for entering and leaving the vehicles may be associated with either side of the roadway, so that the rest of the traffic will not be impeded by the vehicles that are stopping. Before and after each station a switch may be provided, so that the vehicles which are not stopping at the station may travel past it at full speed on the main track.

A road system of this kind shall be referred to hereinafter as a track taxi road system, and the vehicles traveling thereon shall accordingly be called track taxis.

2. DISCUSSION OF PRIOR ART

Traffic control in cities of great population density is encountering increasing difficulty. The number of vehicles of all kinds, such as passenger cars, trucks and buses, is increasing rapidly, and the streets available in the cities can be widened only in rare cases and then only at high cost. In spite of the high speed of travel, the time required to travel from one point to another is increasing. This completely unsatisfactory and constantly deteriorating situation, the excessive amount of time required in order to travel short distances, the noise and the environmental pollution due to exhaust gases, and the frequency of accidents, all call for a new transportation system which will combine the comfort and the individuality of the passenger car insofar as possible with the manageability of a public system of conveyance. One particularly progressive means to the solution of these problems is the automatic track taxi network, which consists of a system of tracks running through all streets. The most desirable drive system for use in such an automatic track taxi system would be an electrical drive system in which all track taxis would receive their propulsive power from a trolley wire or third-rail system.

SUMMARY OF THE INVENTION

Broadly, this invention contemplates an improvement in a drive system for an automatic road system with electrically powered, passively guided vehicles and stations at which passengers may leave and enter, which improvement comprises vehicles which are driven and braked by a direct current motor whose field coil is fed by a battery located in the vehicle and whose armature is fed with direct current through a vehicle conductor disposed along the road from at least one stationary apparatus provided with phase shift control, which apparatus is in electrical association with said automatic road system.

In accordance with the present invention there is provided a drive system for an automatic road system wherein the vehicles are driven by a direct current motor having a field coil fed by a battery located in the vehicle. The vehicle also contains an armature which is fed with direct current from a vehicle control disposed along the tracks of the automatic road system. Positioned within the vehicle is a running and braking controller which receives signals from a current measuring means in the circuit containing the armature and a second current measuring means in the circuit containing the field. The vehicles are battery-driven and in a circuit-containing battery and field a rectifier is employed which receives a signal from the running and braking controller. The running and braking controller is also fed signals from a line conductor disposed along the road of the automatic road system. The vehicle generally is in electrical association with a two-pole trolley track. The vehicle as utilized in such automatic system is provided with, at each phase shift controller, a voltage regulator in electrical association with a volt meter which measures the voltage along the tracks. The same voltage regulator feeds and receives signals from a cybernetic system to maintain the desired values during, for instance, acceleration from a station. The cybernetic system helps to control the electrical power emanating from the stationary phase shift controllers to the tracks and thus to the electrically driven vehicle. Preferably the phase shift controllers comprise a thyristor.

The power that is to be transmitted by the trolley wire or third-rail system to the track taxis may be fundamentally in the form of direct current or in the form of single-phase or three-phase alternating current. If direct current is used, the motor control may be in the form of a direct current control using thyristors and known as a chopper control. If three-phase alternating current is used, a thyristor phase angle control may be provided. Regardless of the type of current used, each vehicle would, on the basis of the prior art, have to be equipped with a thyristor control for running and braking. If we assume the weight of a track taxi when empty to be 1,150 kg and the payload (4 persons) to be a maximum of 300 kg with a vehicle length of 3 meters, and if we require a maximum speed of approximately 100 km/h, we arrive at an hourly power of approximately 20 kW for the drive motor. For this power the thyristor control of a track taxi can be reckoned to weigh about 130 kg, and thus it is easy to determine the power consumption that is necessitated by the need for a thyristor control to be contained in each individual track taxi.

The invention is addressed to solving the problem of reducing the vehicle weight by making the thyristor control system a stationary one instead of placing it in the vehicle in order thus to reduce the installation costs as well as the power consumption. Another object of the invention is to limit the total number of thyristor control systems needed to a minimum. To solve these problems, the invention provides that each vehicle is driven and braked by a direct-current motor whose field winding is energized by a battery located in the vehicle and whose armature is supplied with direct current by a trolley wire or third rail provided along the track, from one or more stationary systems having phase shift control. These stationary apparatuses using phase shift control are preferably thyristor rectifiers supplied with three-phase alternating current. The automatic system controlling the operation of the road network can be manipulated by signals from the vehicle and can affect the phase shift control accordingly. This can be effected through a line conductor. The field current may also be controlled by the automatic system through this line conductor.

Since the field current and the armature current are supplied to the direct-current motor of the individual vehicle from different power sources, special means are necessary if the series-wound characteristic of the drive motor is to be maintained under all running conditions, including starting and running on upgrades. For this purpose, current measuring circuits are installed at the input to the motor armature and field coil, the measurements to be compared in a running-braking control in the vehicle, so that a direct-current regulator in the field circuit may equalize the field current with the armature current. The voltage in the trolley wire or in the individual sections thereof, as the case may be, can be detected by a voltmeter which will feed the pulse sequence to the rectifiers through a voltage regulator for the phase shift control.

In order to be able to use the smallest possible battery as the power supply for the field coil, provision may furthermore be made for charging this battery, using a controlled rotary converter or a static converter whose input is fed power from the trolley line.

In order to retard a vehicle for a stop at a station to take on or discharge passengers, a braking section consisting of several, six for example, segments may be provided at the approach to each station, each segment being associated with a braking impedance connected to the trolley wire, and the braking impedances having a resistance value which diminishes from segment to segment as the station is approached. These braking impedances may be resistances. Converters which feed the braking energy back into the line for regenerative braking may also be used as braking impedances. The stationary rectifiers supplying the trolley wire may also be converters if braking energy is to be fed back to the line. Such feed-back of braking energy to the line may be used not only in the braking sections at approaches to stations but also on downgrades and even at approaches to crossings for the purpose of merging traffic from different tracks. In order to achieve uniform braking, the individual braking impedances of each segment may be diminished or may be controlled in accordance with the required braking torque curve in a stepwise or continuous manner, by means of a positively controlled valve or electromechanical circuit elements or by means of a chopper control system, functioning on the basis of the actual retardation or on the basis of the armature voltage curve associated with the retardation.

In order to accelerate the vehicles to full speed when they depart from a station, an acceleration section may be provided at the exit from the station, consisting of several, six for example, segments, each segment of the acceleararion section being powered by a separate phase shift control system and the voltages in the individual segments being so gradated that the vehicle leaves the final segment at the full armature voltage and hence at top speed.

It is desirable for the trolley wires or third rails to be divided into sections along the route, each section being powered by a separate phase shift control system operating normally at full output. These phases shift control systems are so designed that their output corresponds to the running motor current demand of all vehicles traveling at a constant on-center spacing of, for example, 10 m from vehicle to vehicle. This phase shift control system, however, is able to increase its output from any lower voltage so that whenever some trouble, say the momentary failure of the line voltage, causes the speed of the vehicles to drop below their full running speed, or even brings them to a full stop, they can be reaccelerated to full speed. Within each station it is desirable for the braking section to be follwed by a maneuvering section powered by a separate phase shift control system, so that the vehicles which enter the station from the braking section and are brought to a halt in the station, may be maneuvered to the beginning of the accelerating section. In each individual vehicle it is desirable to provide a relay in the field circuit and/or in the armature circuit so as to enable the vehicle to be taken out of operation by interrupting the circuits.

BRIEF DESCRIPTION OF DRAWINGS

An example of the embodiment of the invention will now be explained with the aid of the drawings, in which.

DESCRIPTION OF SPECIFIC EMBODIMENT

Figure 1:
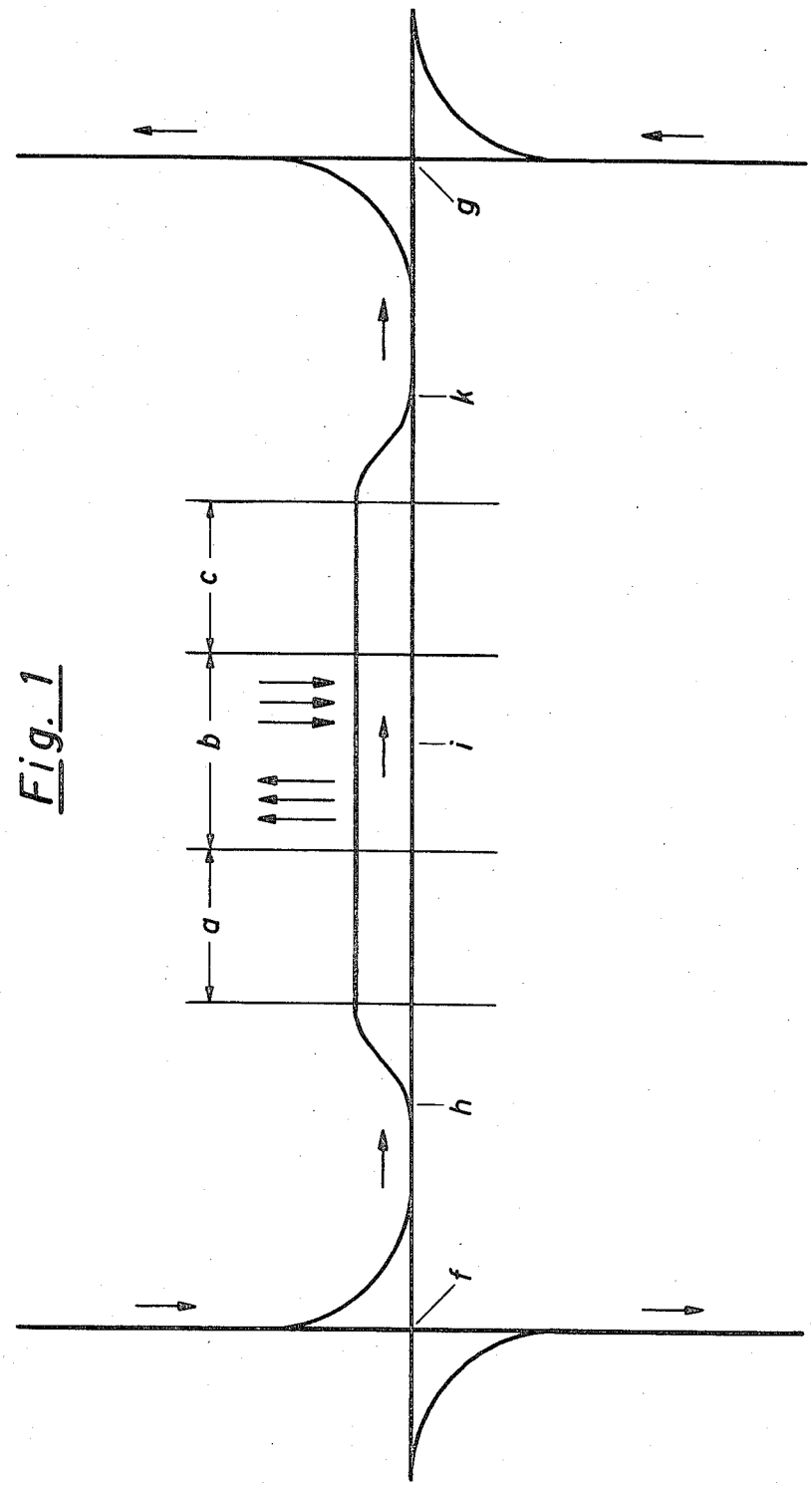
FIG. 1 is a diagrammatic representation of the arrangement of a station within the traffic grid of a track taxi road system.

Referring to the drawings herein and especially to FIG. 1, individual tracks are represented by single lines. The station is located between two crossings $f$ and $g$. The direction of travel on the section between the crossings is from $f$ toward $g$, as indicated by the arrows. At the approach to the station is a switch $h$ by which the vehicles which are to stop are guided into the station, while the vehicles which are not going to stop are carried past the station on the through track $i$. The track leading through the station reenters the through track at the switch $k$. The station branch is divided into three sections, namely section $a$ in which the vehicles are braked, section $b$ which forms the actual station where the vehicles stop to pick up and discharge passengers and are maneuvered, and which therefore shall be called the maneuvering section, and section $c$ in which the vehicles are accelerated back to full speed so as to reenter the traffic stream at switch $k$. The braking section $a$ is divided into several segments in which the vehicle is braked stepwise, and likewise the acceleration section $c$ is divided into several segments in which the vehicle is accelerated in a stepwise manner. The number of the segments in the braking section and in the accelerating section may be determined more or less on the basis of the following consideration.

If we assume that a section of road with an associated station has a length of, for example 600 m, and that the vehicles travel with a spacing of 10 m on centers, we will have a maximum traffic load of 60 vehicles on a section of track. If we furthermore assume that in one station, six vehicles can be handled simultaneously including arrival and departure, the braking section $a$ and the accelerating section $c$, disregarding the maneuvering section, would have a length of, for example $6 \times 10$ m $= 60$ m. These six vehicles are equivalent to 10 percent of the maximum traffic load on a section of road. On the basis of the 10-meter vehicle spacing, the segments of the braking section $a$ and of the accelerating section $c$ should not be longer than 10 m, because only one single vehicle may be located at any time on any segment. With this figure as the basis, it is found that both braking section and the accelerating section are divided, for example, into six segments each. If a different average vehicle spacing is chosen, the length of the segments will change accordingly, and the number of segments will vary with the number of vehicles which may be located simultaneously in the braking section and in the accelerating section. If the empty weight of a vehicle is assumed to be 1,150 kg, and the payload is 300 kg. and if the maximum speed is assumed to be 100 km/h and the maximum accelerating 2.4 m/sec/sec, the maximum power for the vehicle motor will be approximately 35 kW, it being possible to keep the maximum acceleration rate constant up to about 45 km/h. From this it is calculated that the power consumed by the vehicle motor will be around 20 kW/h.

Figure 2:
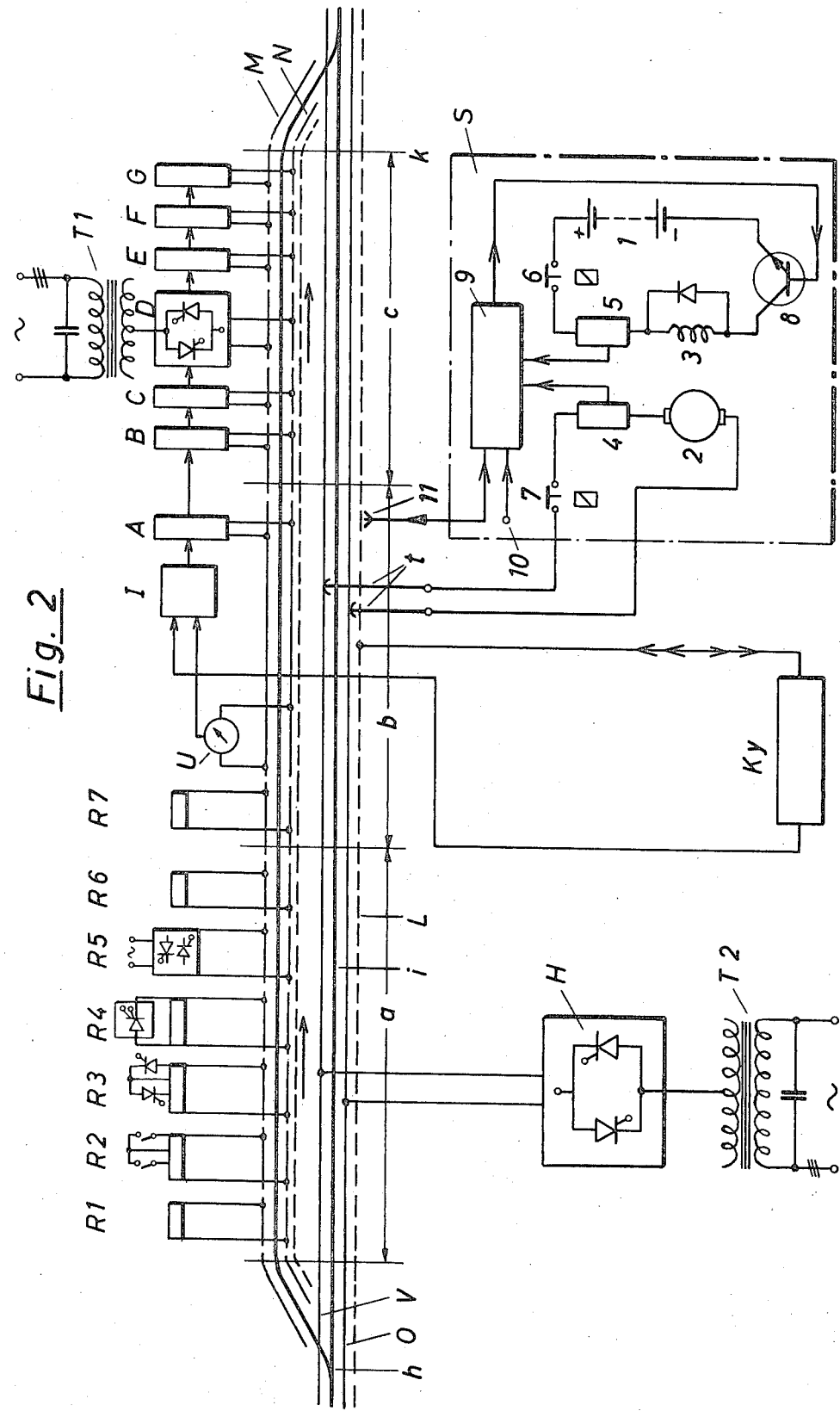
FIG. 2 is a schematic diagram of the circuit of the power supply system of the vehicles including the stationary apparatus.

In FIG. 2 the tracks are represented by continuous heavy lines. Along the through track $i$ lies the two-pole trolley line OV. At the switch $h$ the track leading into the station branches off from the through track $i$. Along this track are the trolley lines MN. Within the braking section $a$ the trolley wires are divided into six segments, for example, and with each of these segments there is associated one of the resistances R1 to R6. Within the maneuvering section $b$ there is applied to the trolley line one more resistance R7 by which the vehicle is braked to a halt. The section of trolley line with which resistance R7 is associated is adjoined by another trolley line section which is powered from a thyristor system A. Through this thyristor circuit the current required for maneuvering can be supplied to the vehicle in the maneuvering section. In the acceleration section $c$ the trolley wires are again divided into six segments, for example, and each of these segments is powered from one of the thyristor control circuits B to G. As schematically represented in the case of thyristor circuit D, the thyristor is powered from a three-phase alternating current transformer T1, the current being regulated by phase shift as required for the segment in question. What has been said about the thyristor system D applies, of course, also to the thyristor systems A, B, C, E, F and G. The power may be supplied through a common transformer which can best be provided with a separate secondary coil for each thyristor system connected to it, or each thyristor system may be supplied by a transformer of its own.

Along the through track, and along the track leading through the station are laid line conductors L which on the one hand receive signals from the cybernetic system Ky by which the entire network is controlled, and deliver them to the vehicles, and on the other hand receive signals from the vehicles and deliver them to the cybernetic system.

With each of the thyristor control systems A to G there may be associated a voltage regulator I represented with thyristor system A only, which provides the control system with the phase shift control required for the associated segment. A voltmeter U measures the voltage in the associated trolley conductor segment and delivers the reading to the regulator I. The trolley conductors O and V which are associated with the through track $i$ are likewise powered from a thyristor control system H which is connected to the transformer T2. This control system, too, may be controlled through a voltmeter, which is not shown, and a voltage regulator I, this voltage regulator being able not only to provide the correct pulse sequence required by the phase shift control for propulsion, but also being able to provide the pulse sequence for feed-back to the three-phase alternating current line if the vehicles are to be slowed down on the through track. This thyristor control system H is designed so as to be able to supply a maximum of 60 vehicles under the circumstances initially assumed to prevail, that is, for a track length of 600 meters, for example.

In FIG. 2, the circuit elements of a single vehicle S are circumscribed by a dash-dotted line. The vehicle is propelled by a direct current motor with a series characteristic, whose field winding 3 is supplied with direct current from the field battery 1 through a relay 6, a current measuring circuit 5 and a rectifier 8. The motor armature 2 is supplied from the trolley wires through a current measuring circuit 4, a relay 7 and the two-pole trolley $t$. The armature of the motor thus receives the controlled current on the through track $i$ from the trolley wires O and V, and in the area of the station it receives current from the trolley wires M and N. The field battery 1 may be charged in a conventional manner by a rotary or static converter from the trolley wires, an additional regulating system, which is not shown, keeping the battery voltage constant. In the vehicle there is furthermore a running and braking regulator 9. To this running and braking regulator 9 are connected on the one hand the outputs of the two current measuring circuits 4 and 5 whose readings are compared with one another in the running and braking regulator, and on the other hand the direct current regulator, which on the basis of the armature current and field current measurements performed in the running and braking regulator matches the field current to the armature current, thereby assuring the series characteristic of the motor. Furthermore, signals received from the line conductor L through an antenna or coil 11 are fed to the running and braking regulator, and vice versa the signals which the vehicle transmits to the cybernetic system are transmitted through this antenna or coil 11 to the line conductor L. To prevent overbraking, such as might occur on a slippery track, such as a wet or icy one for example, an overbraking relay 10, such as is known in the art, may also be provided in the vehicle, and, upon the occurrence of overbraking, will affect the direct current regulator through the running and braking regulator 9 so as to diminish the braking action.

The stationary cybernetic control system Ky, which has previously been mentioned, has the purpose of supervising and controlling all running and braking processes, keeping the track taxis at the correct spacing of, for example, 10 m, and setting the switches at each crossing and at the entrance and exit of each station.

The construction of this cybernetic system is not a subject of the invention.

The drive system of the invention operates in the following manner:

As soon as the cybernetic system has assumed control of the vehicle, first the relay 6 in the field circuit is closed by a signal given through line conductor L to the vehicle, whereupon the field coil is energized. With the closing of the relay 7 the motor armature is applied to the trolley wire voltage so that the motor can start. After confirming that the vehicle is ready to run, the cybernetic system moves the vehicle to the segment associated with the rectifier B in which the vehicle is accelerated. Then it passes successively into the segments associated with the rectifiers C to G and reaches the switch k at the speed at which the vehicles traveling in track i are running and merges with them at the proper car spacing. The vehicle then continues to be supervised and controlled by the cybernetic system through the line conductor L. The thyristor systems B to G supply to the individual segments of the trolley wires M and N a direct current with a set ratio 180/6 = 30°. The power supply voltage for the thyristor systems may be taken from an available three-phase alternating current power line and may amount to about 380 V. Each through track of a length of, for example, 600m, i.e., track i in FIG. 2, is powered from a thyristor control system which supplies the through track with a constant DC voltage independently of variations in the alternating current mains. This thyristor control system, designed to handle 60 track taxis for example, may also be varied from zero to full output voltage, so that if the main voltage has been cut off in the event of trouble and the cars have been stopped, they may be accelerated back up to full speed when the power is restored.

By means of the direct current regulator or rectifier 8 the field strength of the running motor may be weakened by diminishing the field coil current. This will result in an increase in velocity. On the other hand, by increasing the field current the vehicle can be retarded, the braking energy being returned to the trolley wire mains by the motor armature as regenerative braking, the same as in a shunt motor. In this manner, varying the field current can achieve necessary operational corrections in an individual vehicle throughout the trip program, both during acceleration and in running at full speed, and during braking, as often as desired, and continuously.

The individual braking resistances with their ohmic values diminishing from segment to segment constitute a coarse gradation. To refine the gradation, relays as represented in R2 or also individual thyristors as represented in R3 may be associated additionally with the resistances. It is also possible, however, to diminish the ohmic values of the resistances by the use of a chopper control as represented in R4 or to coordinate them with the required braking moment curve. Instead of the braking resistances, or in addition thereto, thyristor converters may as represented in R5 also be provided in the segments of the braking section to yield a portion of the useful DC braking power to the AC line in the form of alternating current.

If each of the thyristor systems B to G supplies an unvarying current intensity to the segment with which it is associated in the acceleration section of the track, naught but a rough gradation would be provided and therefore the acceleration of the track taxi would be jerky. In order to achieve a smooth acceleration, therefore, when a vehicle is in the accelerating section the individual thyristors B to G are so controlled by the cybernetic system that the current intensity rises until the vehicle leaves the segment in which it is located, whereupon the next segment to receive the vehicle is powered by its associated thyristor system with an initial current equal to the final current in the preceding segment, and the current is increased again in this segment while the vehicle is present therein, thereby achieving a step-less acceleration of the vehicle.

We claim:

1. In a drive system for an automatic road system with electrically powered passively guided vehicles for passengers conveyence and at least one station, the improvement wherein trolley wires are disposed along the road, said trolley wires divided at least after each station in the direction of travel into segments, each of these segments powered from a separate phase shift control system, the voltages in each phase control system being so graduated that the vehicle's armature is wide open as it passes through the final segment of an acceleration section, and before each station in the direction of travel of the vehicles in said system, said trolley wires divided into segments, each segment being associated with a braking impedance means having a resistance value which diminishes from segment to segment stepwise toward said station, each vehicle being driven and braked by a direct current motor whose field coil is fed by a battery located in said vehicle and whose armature is fed with direct current through said trolley wires, powered with phase shift control.

2. An improvement according to claim 1 wherein said automatic system comprises a plurality of resistors in electrical association with said automatic road system to provide stepwise deceleration of a vehicle and said automatic road system comprises a plurality of phase shift controls to provide stepwise acceleration of said vehicles.

3. An improvement according to claim 1 wherein the apparatus provided with phase shift control is a thyristor rectifier fed with three-phase alternating current.

4. An improvement according to claim 1 wherein said vehicle contains a plurality of current measuring means which make measurements, one current measuring means being disposed in the circuit containing said armature and another being disposed in the circuit containing said field winding, said current measuring means in electrical association with a running and braking controller wherein said measurements are compared, the circuit containing said field winding containing a direct current regulator responsive to a signal from said running and braking controller, said direct current regulator equalizing the field current with the armature current.

5. An improvement according to claim 1 wherein the trolley wire of said automatic road system are in electrical association with a volt meter which feeds a signal to a voltage regulator, which in turn is electrically associated with said phase shift control system and feeds to said system the pulse sequence for the phase shift control.

6. An improvement according to claim 4 wherein said vehicle contains a regulated rotary or static converter whose input side is fed from the trolley wires and whose output side is in electrical association with a battery supplying current to the field winding of the motor.

7. An improvement according to claim 1 wherein at least one stationary apparatus for providing braking impedance comprises a converter.

8. An improvement according to claim 1 wherein the individual braking impedance from each stationary apparatus is reduced stepwise by a positively controlled valve in association therewith.

9. An improvement according to claim 1 wherein an electromechanical circuit is in association with the braking impedance means to provide stepwise reduction of the braking impedance.

10. An improvement according to claim 1 wherein a chopper control is in electrical association with the braking impedance means to provide continuous reduction of said braking impedance.

11. An improvement according to claim 1 wherein the trolley wires are along the road divided into sections, each section being in electrical association with a separate phase shift control system which is wide open in normal operation and is dimensioned such that its output power corresponds to the motor power demand of all vehicles running with a permanent on-center spacing, said phase shift control system being variable so as to be stepped up from any lower voltage.

12. An improvement according to claim 1 wherein each station of the automatic road system is provided with a maneuvering section, the trolley wires of this section connected with a final braking impedance or powered by a separated phase shift control system and said maneuvering section located between a first acceleration segment and a subsequent braking segment.

13. An improvement according to claim 12 wherein the maneuvering section comprises a final braking impedance means and an initial stationary apparatus provided with phase shift control to furnish acceleration.

14. An improvement according to claim 1 wherein each vehicle is provided with a first relay in the circuit containing said field winding and a second relay in the circuit containing said armature.

15. An improvement according to claim 1, wherein each of the segments of the acceleration section after each station is powered from a separate phase shift control system, said system is controlled by a cybernetic system, the phase shift in each segment raising the current intensity where a vehicle is in the segment, the phase shift, when the vehicle leaves said segment, being equal to the initial phase shift in the following segment.

* * * * *